L. WINTER.
GLASS PANE FOR WINDSHIELDS AND THE LIKE, AND PROCESS OF MAKING THE SAME.
APPLICATION FILED JAN. 29, 1920.

1,438,470. Patented Dec. 12, 1922.

INVENTOR
Louis Winter,
BY
Wm H Caufield
ATTORNEY.

Patented Dec. 12, 1922.

1,438,470

UNITED STATES PATENT OFFICE.

LOUIS WINTER, OF NEWARK, NEW JERSEY, ASSIGNOR TO BERNARD W. SCHNUR, OF NEWARK, NEW JERSEY.

GLASS PANE FOR WINDSHIELDS AND THE LIKE AND PROCESS OF MAKING THE SAME.

Application filed January 29, 1920. Serial No. 354,829.

*To all whom it may concern:*

Be it known that I, LOUIS WINTER, a citizen of the United States, residing at Newark, in the county of Essex and State of New Jersey, have invented certain new and useful Improvements in the Use of Glass Panes for Windshields and the like and Processes of Making the Same, of which the following is a specification.

This invention relates to the provision of a clear, smooth pane of glass for use in automobile wind shields and the like, whereby a cheap kind of glass is treated so that the distortion and poor vision usually resident in such glass are corrected.

Figure 1:
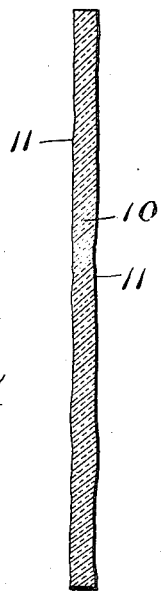
Figure 2:
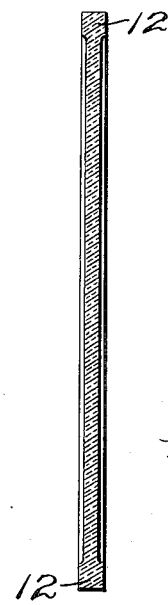
Figure 3:
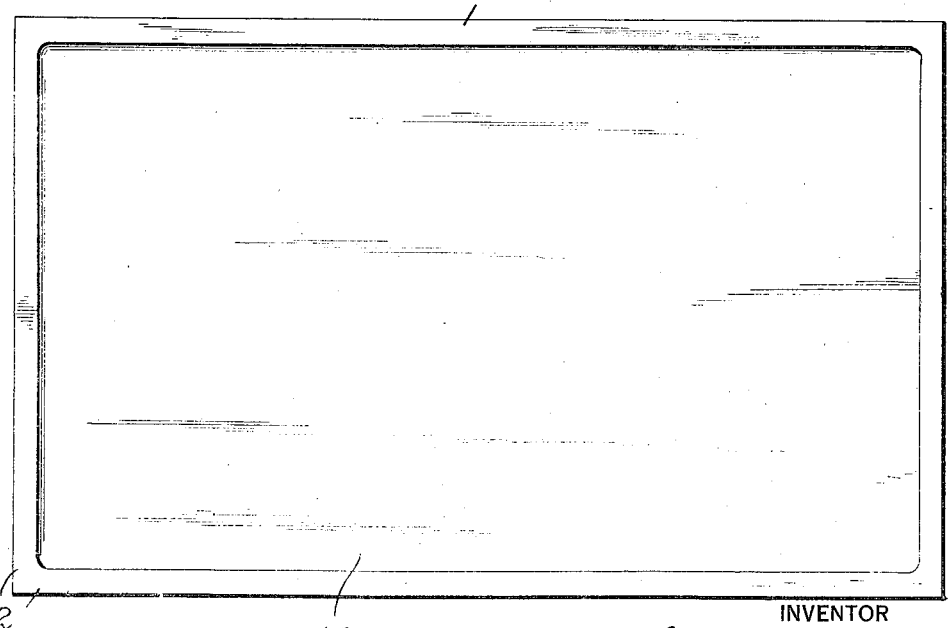

The invention is illustrated in the accompanying drawing, in which Figure 1 is a section of a pane of glass before it has been ground. Figure 2 is a similar view after it has been ground, and Figure 3 is a face view of the pane shown in Figure 2.

It is absolutely essential, that glass required to be used for wind shields and doors of automobiles must have smooth, unbroken surfaces on the plane sides. This is necessary to give a perfectly clear vision. Glass, not having such smooth unbroken surfaces on the plane sides, blurs the vision, which, of course, may cause accidents. The only glass manufactured, that has such smooth, unbroken surfaces on the plane sides, is plate glass. This glass is made by what is known as the moulded or cast method and is very expensive, and, at the present time, is very difficult to obtain. Glass made by the "blown" method, and called "blown" glass, has no such smooth, unbroken surfaces on the plane sides as plate glass, and, although it is very much less expensive and much more easily obtained at the present time than plate glass, it can not be used under ordinary conditions for wind shields and doors of automobiles. Another point that must be borne in mind is the fact that the channels in wind shield and door frames for automobiles is at least three-sixteenths inches wide. This means that a glass having a thickness of three-sixteenths inches must be used, and the only glass manufactured of such thickness is plate glass and crystal sheet glass. As stated above, plate glass is very expensive and difficult to obtain. Crystal sheet glass is a "blown" glass and has wavy, and not smooth unbroken, surfaces on the plane sides. If a crystal sheet glass is ground on the entire surface of each of the plane sides, the glass would not have the proper thickness to fit the average wind shield and door channels, nor would it have the proper strength to withstand the various shocks to which a wind shield or glass door of an automobile is subjected to.

My invention consists of taking a crystal sheet glass 10 of the proper dimensions as required for a particular wind shield or door, and removing all the waves 11 from the surfaces of the plane sides up to within about an inch of all the edges of the crystal sheet glass. The removal of the waves from the entire surface of the plane sides of the crystal sheet glass to within about one inch of the edges of the plane sides will permit of a clear, unblurred vision. The waves or inequalities 11 in one or both faces of the sheet or pane of glass 10 are removed by grinding. The preferred way of doing this is to place the sheet of blown glass on a solid bench, usually covered with felt to prevent the cracking of the glass. The grinding is usually done by a revolving square block of iron or the like, weighing, say, about twenty pounds and traversing one side of the glass plate, revolving at a rate of about three hundred revolutions per minute. I use carborundum and water for this operation. Both sides are done and then treated the same way, using a fine emery powder.

The faces so treated are then smoothed by a sand stone block, which is kept wet with water and rotating about two hundred and fifty revolutions per minute. Next, the glass is polished by a felt block together with rouge mixed with water. This shines the glass and makes it transparent and smooth like plate glass. The machinery for accomplishing these steps is of the ordinary kind used by glass workers. A crystal sheet glass, having the waves so removed to within about an inch of the edges of the plane sides, will not have its original strength impaired, but will be able to withstand all the shocks and jars to which an automobile door or wind shield is subjected to. And because of the fact that the glass around the edge of the glass on the plane sides is not ground, the original thickness of the edge 12 thereof is not altered, and the crystal sheet glass, having the plane surfaces smoothed out as above described, will fit the channels of the wind shield or automobile door.

I claim:—

1. A pane for wind shields, said pane being made of blown glass having its surface ground to provide a reduction in thickness and a smooth surface, such ground portion terminating short of the edges to leave a marginal thick portion for securing the pane to a frame.

2. The process for making glass panes for wind shields and the like which consists in the provision of a sheet of blown glass and then grinding and polishing both sides of said sheet over both its faces and terminating said grinding short of the edges to provide a marginal thick portion.

LOUIS WINTER.

Witnesses:
BERNARD W. SCHNUR,
THERESE WINTER.